United States Patent [19]

Anderson

[11] Patent Number: 4,476,465
[45] Date of Patent: Oct. 9, 1984

[54] MAGNETO-OPTIC DISPLAY GENERATOR

[75] Inventor: Robert H. Anderson, Long Beach, Calif.

[73] Assignee: Litton Systems, Inc., Beverly Hills, Calif.

[21] Appl. No.: 412,878

[22] Filed: Aug. 30, 1982

[51] Int. Cl.³ .............................................. G09G 3/20
[52] U.S. Cl. ..................................... 340/783; 340/763;
    340/764; 340/716; 350/376; 350/377; 350/403
[58] Field of Search ............... 340/783, 793, 737, 716,
    340/717, 705, 795, 764; 350/374–378, 388, 392,
    407, DIG. 3; 358/241, 61

[56] References Cited

U.S. PATENT DOCUMENTS

| | | |
|---|---|---|
| 3,715,736 | 2/1973 | O'Donnell et al. |
| 3,717,853 | 2/1973 | O'Donnell et al. |
| 4,114,191 | 9/1978 | Lund |
| 4,170,772 | 10/1979 | Bly ........................... 340/783 |
| 4,228,473 | 10/1980 | Himuro et al. ............. 350/375 |
| 4,229,072 | 10/1980 | Torok et al. ............... 358/61 |
| 4,239,337 | 12/1980 | Campbell et al. .......... 350/375 |
| 4,281,905 | 8/1981 | Harvey et al. ............. 350/377 |
| 4,309,084 | 1/1982 | Hill .......................... 350/403 |

OTHER PUBLICATIONS

Fast Switchable Magneto-Optic Memory-Display Components by B. Hill & K. P. Schmidt, appeared in *Phillips Journal of Research*, vol. 33, Nos. 5/6, 1978; pp. 211–225.

*Primary Examiner*—Gerald L. Brigance

[57] ABSTRACT

A magneto-optic display generator for disposition in a light beam to provide a projectible, directly viewable, or sensible display image. Two separately driven magneto-optic display chips are positioned between a polarizer and an adjustable polarization analyzer. By adjusting the angular relationship between the polarization axes of the polarizer and polarization analyzer, as well as by the use of chips having different Faraday rotations, various visual effects can be created. Such effects as depth of field and the elimination of areas which can be common or not common to both displays can be accomplished.

13 Claims, 20 Drawing Figures

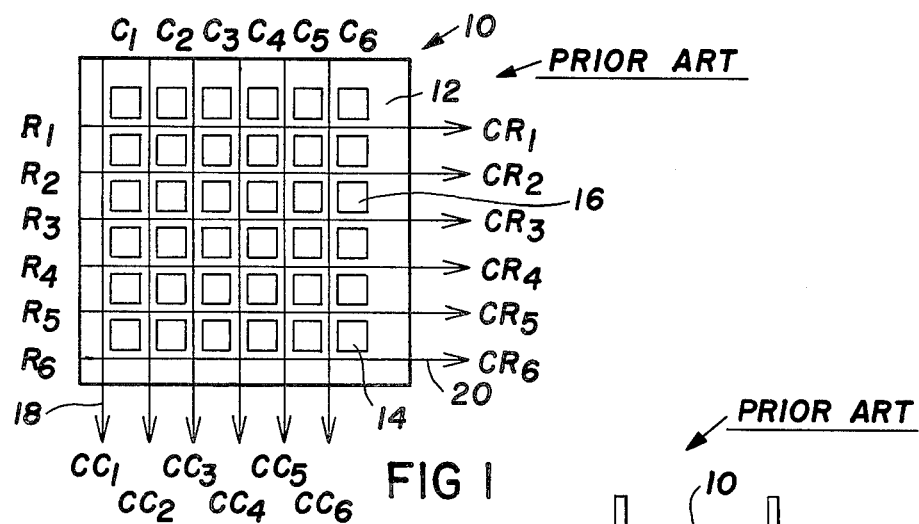
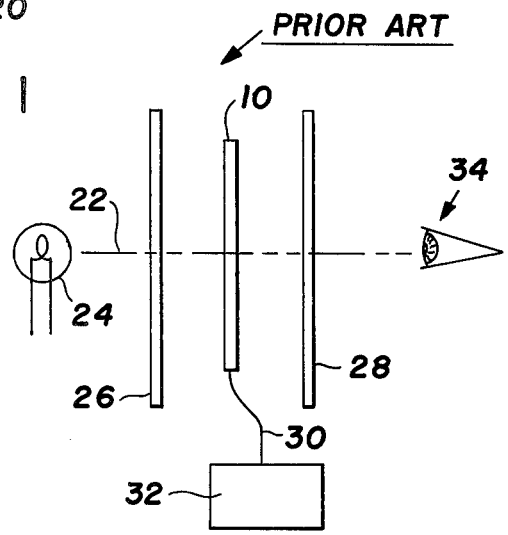
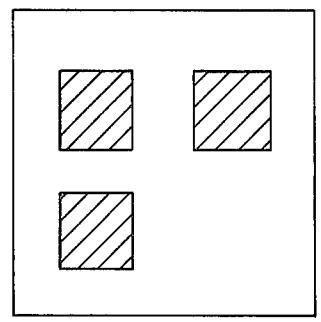
FIG 4
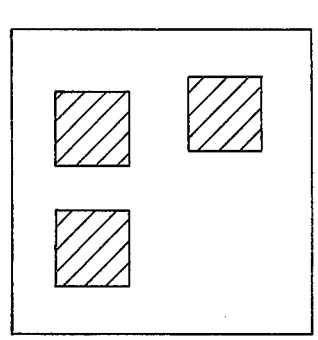
FIG 5
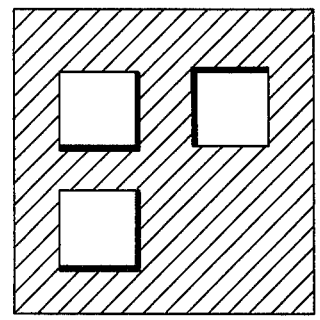
FIG 6

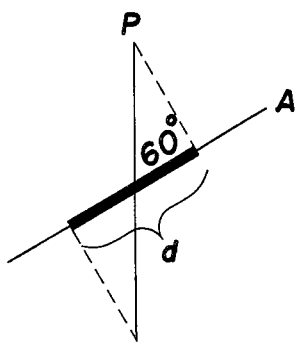
FIG 11
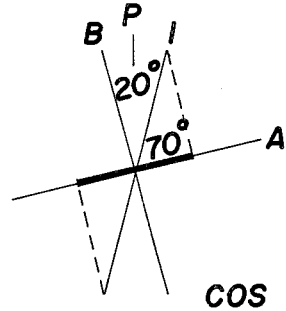
FIG 13   $\dfrac{\cos 70° = .34}{\cos 90° = 0}$
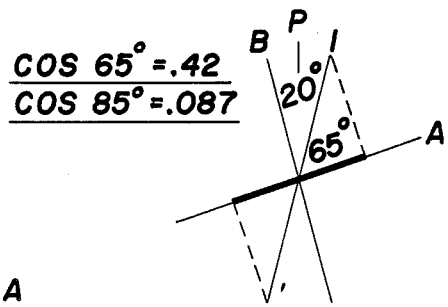
$\dfrac{\cos 65° = .42}{\cos 85° = .087}$
FIG 14
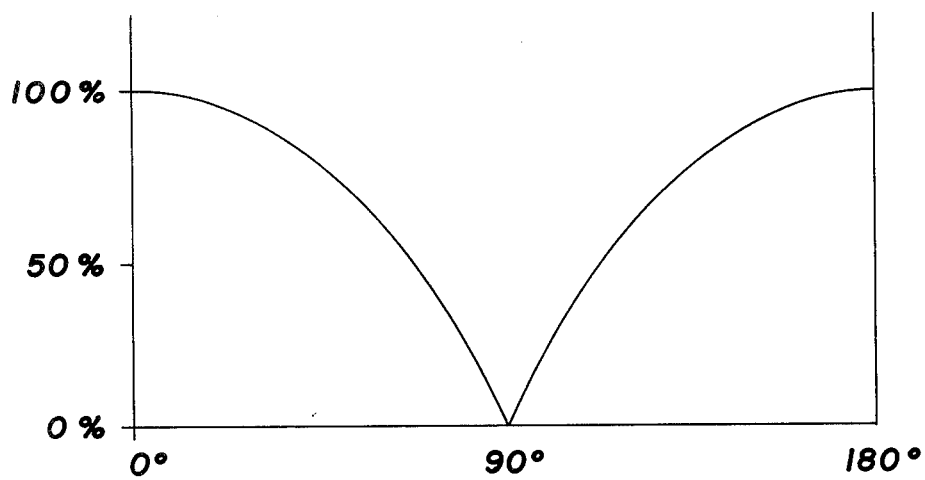
FIG 12
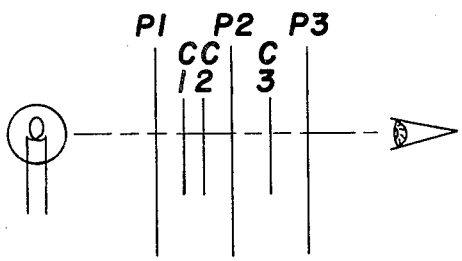
FIG 19
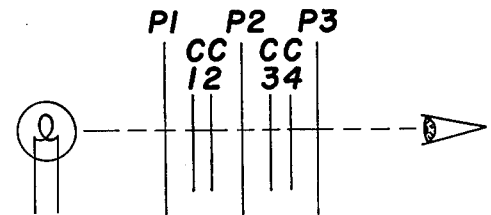
FIG 20

MAGNETO-OPTIC DISPLAY GENERATOR

BACKGROUND OF THE INVENTION

The present invention relates to display systems and, more particularly, to display systems incorporating magneto-optic chips employing Faraday rotation in conjunction with polarized light.

Magneto-optic displays are a phenomenon gaining rapid acceptance. Chips, such as that generally indicated as 10 in FIG. 1, comprise a substrate 12 having a film 14 of a material such as garnet (which will rotate polarized light by the so-called "Faraday effect") which film is divided into posts 16 to form a rectangular pattern of rows (labelled for convenience R1-R6) and columns (labelled for convenience C1-C6). Control wires 18 and 20, respectively, are placed between the columns (designated CC1-CC6) and between the rows (designated CR1-CR6). In this configuration, each post 16 can be addressed individually in the manner of a core memory at the intersection of a column control wire 18 and a row control wire 20. Each post 16 represents a pixel position in the overall display. The material of the film 14 has the effect of rotating polarized light in one direction by Faraday rotation when magnetized in one direction and of rotating polarized light in the opposite direction when magnetized in the opposite direction thus modulating the light passing therethrough. Such chips are discussed in greater detail in co-pending applications Ser. No. 375,329, filed May 5, 1982, by R. H. Anderson, titled IMPROVED MAGNETO-OPTIC IMAGE SCANNING DETECTOR and Ser. No. 375,321, filed May 5, 1982 by R. H. Anderson, W. E. Ross, and T. R. Maki, titled MAGNETO-OPTIC CHIP WITH GRAY-SCALE CAPABILITY, both of which are assigned to the common assignee of this application.

The chip 10 of FIG. 1 can be disposed in a light beam 22 from a source 24 between a polarizer 26 and a polarization analyzer 28 as shown in FIG. 2. The wires 18, 20 are contained in a cable 30 connected to a driver 32. The driver 32 drives the chip 10 to create display information within the posts 16. Light 22 passing through the polarizer 26 is polarized to the axis of polarization of the polarizer 26. This polarized light in passing through the chip 10 is rotated by the film 14 of each individual post 16 clockwise or counter-clockwise depending upon the magnetization thereof as set by the driver 32. The polarization analyzer 28 is positioned with respect to the expected emerging light orientation from the chip 10 so as to create a contrast between areas rotated in one direction and areas rotated in the opposite direction. This contrast can be seen by the observer 34. The specific effect will be discussed later hereinafter.

Such chips and display systems can be viewed directly as shown in FIG. 2 or can be projected through appropriate optics. Another display system to achieve particular effects is shown in my co-pending application Ser. No. 375,322, filed May 5, 1982 titled SWITCHABLE TANDEM MEMORY MAGNETO-OPTIC DISPLAY also assigned to the common assignee of this application.

Particularly in military use, displays having the capability of providing more than just simple messages are desired. Displays are used to impart a wealth of information. One particular feature which would be desirable and not possible by other display systems of the magneto-optic type heretofore is the conveying of depth-of-field information. Also, it is desirable to have a display which can selectively display only information where there is coincidence between two sources of data or, in the alternative, only where there is lack of coincidence between two sources of data. Such features can be used for image processing in military, space, transportation and computer uses, where either the similarities or differences between different images are detectable, such as in moving target indicators, updated inventory listings, extraction of stereo depth information, character recognition in machine-readable documents, and high reliability information processing.

Wherefore, it is the object of the present invention to provide a magneto-optic display generator which will accomplish the foregoing objectives.

SUMMARY

The foregoing objectives, and others, have been accomplished in the magneto-optic display generator of the present invention which, in its basic embodiment, comprises, in sequence, a polarizer; a first magneto-optic display chip adapted to be connected to a driver providing first display information; a second magneto-optic display chip adapted to be connected to a driver providing second display information; and, a polarization analyzer mounted for rotation to adjust the polarization axis orientation thereof with respect to the polarization axis of the polarizer.

In the preferred embodiment, means are also provided for rotating the polarization analyzer.

DESCRIPTION OF THE DRAWINGS

FIG. 1 is a simplified plan view of a magneto-optic chip as employed in magneto-optic display systems.

FIG. 2 is a simplified side elevation through a basic magneto-optic display system according to the prior art.

FIGS. 4 and 5 show two sample displays according to a described use of the present invention.

FIG. 6 shows the combined display produced by the present invention from the individual displays of FIGS. 4 and 5 so as to convey depth of field information.

FIG. 11 is a simplified drawing showing the effect of a basic polarizer and analyzer upon light passing therethrough.

FIG. 12 is a graph of the basic effect of FIG. 11.

FIG. 13 is a diagram of the contrast created in a first chip orientation with respect to the polarizer and analyzer.

FIG. 14 is a diagram of the contrast created in a second chip orientation with respect to the polarizer and analyzer.

FIG. 19 is a simplified drawing of a display system according to the present invention empolying three chips and three polarizers.

FIG. 20 is a simplified drawing of a display according to the present invention combining four chips and three polarizers.

DESCRIPTION OF THE VARIOUS EMBODIMENTS

Figure 3:
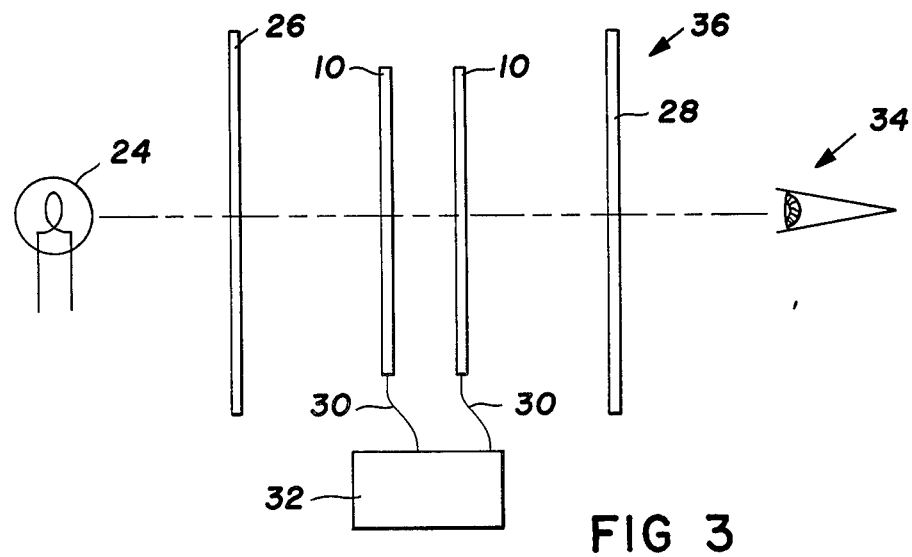
FIG. 3 is a simplified side elevation through the present invention in its basic embodiment.

A display 36 according to the present invention is shown in its simplest form in FIG. 3. Display 36 is designed to be disposed in a beam of light 22 from a light source 24. As with the prior art display of FIG. 2, display 36 can be viewed directly by an observer 34 or, in the alternative, projected by the addition of appropriate optics in a manner well known to those skilled in the art. Display 36 comprises a polarizer 26 and a polarization analyzer 28. A pair of chips 10 are disposed between the polarizer 26 and the polarization analyzer 28. Each chip 10 is connected by a cable 30 to a driver 32 such that each chip 10 can be independently driven by driver 32 with selected display information which could be identical or different. When the film 14 is grown on the substrate 12, it is grown on both sides and, typically, stripped from one side with only the other side being etched into the posts 16. The pair of chips 10 in the display system 36 of FIG. 3 can be conveniently made by etching the film 14 on both sides of the substrate 12 and providing each side with control wires 18, 20 so that each side operates as a separate chip. To further achieve the objectives of the present invention, the polarization analyzer 28 is mounted for rotation in its plane such that the angular orientation between the polarization axis of the polarizer 26 and the polarization axis of the polarization analyzer 28 can be adjusted.

As will now be described in greater detail, the desired mode of operation is selected by choosing a predetermined combination of film thickness, and by applying a predetermined combination of magnetic polarities of the images and their backgrounds to the chips, together with a corresponding rotational position of the polarization analyzer 28 relative to the position of the input polarizer 26. In an image-coincidence mode of operation, only the information which occurs in corresponding positions on both chips 10 is displayed, with no display of information which is stored on only one chip 10. Conversely, in an anti-coincidence mode of operation, the display shows all the information stored on both chips 10, except where it is stored in corresponding positions on both chips 10. In a related partial anti-coincidence or partial subtraction mode, the display shows the information just on one of the chips 10 (either one) except where it is stored in a corresponding position on the other chip 10. There are several other modes of operation with two chips 10 which will be described, and three or more chips 10 may also be used as will be seen later. Further, it will be seen that the use of chips 10 having films 14 of different thicknesses results in other display features.

One application of the display 36 is for the detection and display of changes in images. In that application, substantially identical magneto-optic films of equal thickness are employed in the two chips 10 such that, nominally, a 10° Faraday rotation is obtained from each film. For example, if some known materials are used which characteristically have 1° of rotation per micron of thickness, a ten micron thick film would be used on each chip 10. A first image obtained may be stored on one chip 10, showing a view of the number of aircraft at an airport, castings on a warehouse shelf, names on a class enrollment list, or numbers in a bubble memory. A second image is obtained later and stored on the other chip 10. Any additions made in the second image, and only the additions, will be displayed when the first image is stored with a clockwise rotation polarity, the second image has an opposite polarity, and the polarization analyzer is at 100° clockwise. The deletions from the first image can be displayed by inverting the polarity of both images or changing the analyzer to 80°. Other operating conditions can display the original image plus additions but no deletions (CW, CW, 100°); the original minus deletions but no additions (CW, CW, 80° or CCW, CCW, 100°); or either the first or second image, by storing only one image, with the polarization analyzer 28 at 90°.

Another application for the display 36 of FIG. 3 is shown in FIGS. 4-6. In this application, a stereoscopic pair of images are converted into a bas-relief image for monocular projection and viewing, while retaining depth cues. In FIGS. 4 and 5, aerial photographs or radar images of a ground site are taken at two points in the course of an aircraft flight path. FIG. 4 represents the display at one point in time and FIG. 5 represents the display at the second point in time. It is desired to distinguish between buildings and excavations at an unfinished construction site. To accomplish this objective, one image is transferred and stored on one chip 10 having 10° of Faraday rotation. The other image is stored on the other chip 10, having 20° of rotation, and this image is stretched or smeared by repeated writing with small displacements in both the X and Y directions. If the two displays of FIGS. 4 and 5 as thus created are superimposed in the display system 36 of FIG. 3 with the polarization analyzer set at 95°, the buildings will have been made to case shadows to the southeast and the excavations to cast shadows on the northwest side as shown in FIG. 6. The resulting bas-relief image of FIG. 6 as thus interpreted clearly reveals the characteristic shadow pattern of two buildings and one excavation.

Figure 7:
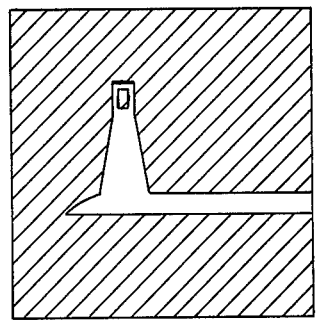
FIG. 7 shows a display of a jetty and lighthouse to be put in one chip of the present invention in another described application.
Figure 8:
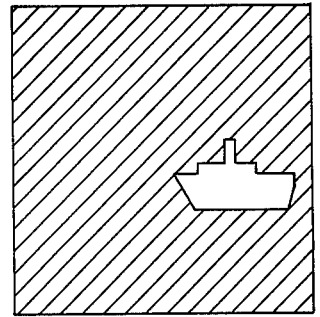
FIG. 8 is a display of a ship to be combined with the display of FIG. 7 according to the present invention.
Figure 9:
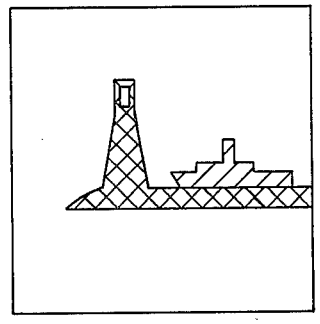
FIG. 9 shows the combination of the display images of FIGS. 7 and 8 according to the present invention in a manner which indicates to the observer that the jetty and lighthouse are in front of the ship.
Figure 10:
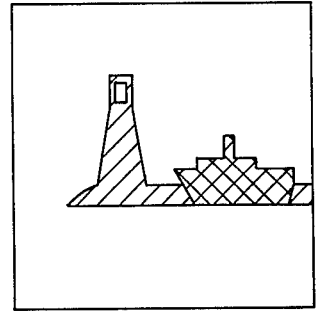
FIG. 10 shows the same combined display wherein the display now clearly indicates to the observer that the ship is closer to the observer than the jetty and lighthouse.

Another application for the display 36 of FIG. 3 is for adding depth perception cues to a composite image derived from several sources. This is shown in FIGS. 7-10. In FIG. 7, a silhouette image of a harbor jetty and lighthouse is stored on one chip 10 having 10° of rotation. As seen in FIG. 8, an image of a ship is stored on the second chip 10, a thick chip having 20° of rotation as in the other example. With the polarization analyzer 28 oriented at 100° CW, the ship is displayed in the background in the ocean outside of the harbor as shown in FIG. 9. With the polarization analyzer 28 at 110°, the ship is displayed in the foreground, inside of the harbor, as shown in FIG. 10. This uncommon effect is achieved by matching the brightness of the bottom half of the ship to the lighthouse in the case of FIG. 9 and to the top half of the ship in the configuration of FIG. 10.

The display image being created can also be sensed by photodetector, or the like, in the position of the observer 34 to achieve other objectives. For example, the system 36 of FIG. 3 can also be used for character recognition in a machine-readable document system. An unidentified character having a standard font, such as a 5×7 alpha-numeric dot matrix, may be scanned and transferred to storage on one of the chips 10. Computer generated characters can be placed in rapid sequence on the other chip 10, in an anti-coincidence mode of operation (opposite polarities of writing on the chips 10 and the polarization analyzer 28 positioned at 90°). The dark level of brightness occurs when the characters match. This is then detected with the photodetector or photocell. A reference signal may also be detected when both chips have no stored character, or in the background area outside of the character matrix area of the chip. In a differential amplifier, a match between the reference signal and the character signal indicates that a character identification has been obtained.

The achieving of all of the these results is a function of the rotation of the image components on the two chips 10 and the relationship of the axis of the polarization analyzer 28. These display effects, and others, may be understood by adding the separate optical rotations of the two chips 10 and then determining the effect of the polarization analyzer 28 by means of a family of curves to be described below. The conditions under which the brightness transmitted through differently magnetized adjacent image areas can be matched, so that no boundary appears between these areas in the display particularly needs to be determined, since many of the image-processing display effects described herein depend on, or consist of, avoiding the display of certain image sections. This can be understood by first examining simpler cases.

As is known, light may be passed through a polarizer and polarization analyzer such as 26 and 28 of FIG. 3 with no other optical elements between them. The transmission amplitude of an ideal analyzer may be determined by finding the length of the projection of a segment of the polarizer axis on the analyzer axis for a selected angle between axes. For example, as shown in FIG. 11, the length (d) of this particular projection is 50% of the length of the polarizer axis segment at 60° between axes. This may be found by reference to the cosine of the angle between them. As shown in FIG. 11, the polarization axis of the polarizer is 60° from the polarization axis of the analyzer. Reference to appropriate tables will verify that the cosine of 60° is 0.50. The transmission amplitude for any analyzer angle is shown in the curve of FIG. 12, which is a cosine curve having a rectified section above 90°, since we have positive rather than negative amplitude of radiation throughout the curve. It should be noticed that when the analyzer is near 90°, a small change in its angular position causes a large amplitude change; but, when it is around 0° or 180°, a large change in position causes a small amplitude change, due to the small slope of the curves adjacent those locations.

The effect of placing a single magneto-optic chip 10 between the polarizer 26 and a polarization analyzer 28 is shown in FIGS. 13 and 14. Light passes through the input polarizer (P) emerging with, say, a vertical polarization axis. The stored image (I) and background areas (B) of the chip 10 rotate this axis 10° (for example) clockwise and counter-clockwise, respectively, in different parts of the display image. FIGS. 13 and 14 show these directions, labelled "I" and "B", as seen looking toward the source of light, for two different analyzer positions. When the analyzer (A) is oriented 90° from the background axis (B), it is then 70° from image axis (I). So the (idealized) transmission amplitudes through the analyzer are cosine 90°=0% for the background and cosine 70°=34% for the image. This difference provides the required image contrast. That configuration is shown in FIG. 13. In practice, the analyzer 28 may typically be set at 65° from the image axis as shown in FIG. 14. This gives cosine 85°=9% for the background transmission amplitude and cosine 65°=42% for the image. This increases brightness at the expense of an unnoticeable loss of contrast in the presence of room light. Note that an amplitude contrast ratio of almost 5 to 1 is an intensity contrast ratio of about 22 to 1, since the intensity is the square of the amplitude of the electric vector.

Figure 15:
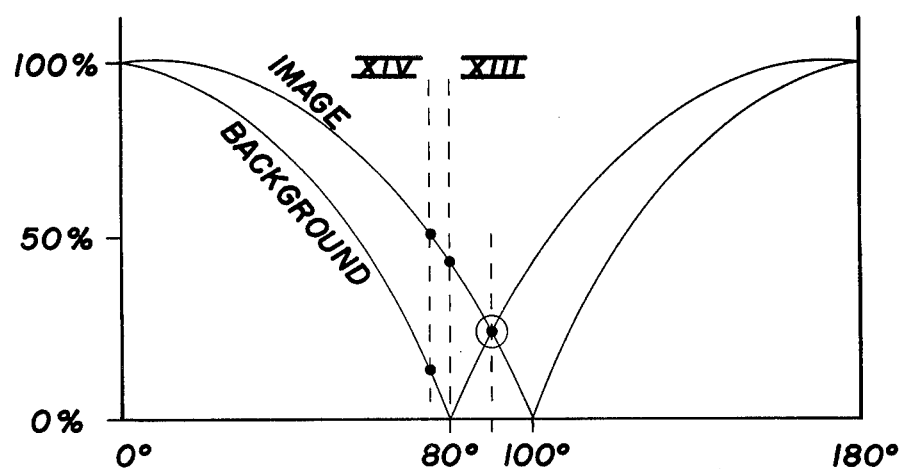
FIG. 15 is a graph of the contrast created between image and background areas and showing the location of FIGS. 13 and 14 on that graph.

The various operating conditions for one chip 10 can be seen more graphically in FIG. 15 where two separate rectified cosine curves are drawn for the analyzer transmission amplitudes of the image and background. The image transmission curve has been displaced 10° to the right because the polarization axis of image light approaching the analyzer has been rotated 10° clockwise from the polarizer axis by the Faraday effect at the chip 10. Similarly, the background transmission curve has been shifted to the left. The dashed vertical line labelled "XIII" shows the operating condition discussed relative to FIG. 13; that is, the analyzer 28 is at 80° relative to the polarizer 26, or 90° relative to the background, giving full extinction of the background, as shown at the lowest point of the background curve. The dashed vertical line labelled "XIV" shows the other operating condition discussed above with reference to FIG. 14, where the intersection of the line with the two cosine curves gives the image and background intensities for the higher brightness display condition.

Of particular interest are the points of intersection of the two curves, where they show equal brightness of the image and background, so no contrast occurs, and no image can be seen. This occurs with the analyzer 90° from the polarizer, or 80° from the image and 100° from the background. Since cosine 80° equals cosine 100° equals 0.17, the image and background areas are not completely dark. The image also vanishes where the curves cross at analyzer settings of 0° and 180°, but in this case, the brightness is high for both image and background.

With a single chip device, only two orientations of image polarization axes are present, entering the analyzer, and when the corresponding brightnesses are matched, there are no display possibilities at that setting. But, with two or more chips and three or more orientations of polarization axes present, a match between any two of the corresponding brightness levels still leaves another level of brightness for display use. It is upon this basis that the present invention is formulated.

Consider two chips 10 with films 14 thereon having equal 10° rotation. If we think of the light passing through each of the two chips 10 as being rotated counter-clockwise or "left" on the one hand or clockwise or "right" on the other hand, it will be understood by basic binary logic that the light will pass through the combined two chips 10 in four possible combinations of successive rotations. If L indicates left rotation and R equals right rotation, these combinations are LL, RL, RR, AND LR. Two of these conditions, RL and LR, have cancelling opposite rotations. In both cases, light enters the analyzer 28 unchanged in polarization, at 0°, so there are only three distinct cases of combined effects, L20°, 0°, and R20°. It is worthy of note at this point that with certain display information (e.g., alphanumeric characters, military vehicles, or other familiar objects) the indicated character or object area may sometimes, by common usage, be referred to as the "image", as distinct from the "background", although the whole field of view is also called the image. If L20° is arbitrarily labelled the background (B), R20° is called the overlapping or crossed images (C), and 0° results from single images (S) on only one film, the following analysis can be made. If the analyzer is oriented along L10°, it has bisected the angle between B and S, and the background and single trace regions have the same projected amplitude of transmission through the analyzer, and are, therefore, indistinguishable from each other in the display. Both are near full brightness since cosine 10°=0.98.

If the analyzer is oriented perpendicular to L10° along line R80°, the projections of B and S on line R80° are also equal, and indistinguishable in the display, but they are both near minimum brightness since cosine 80°=0.17. The crossed traces at R20°, however, have an amplitude of cosine 60°=0.50 and this is readily seen as the bright image against the background of B and S, with an amplitude contrast ratio of 0.50 to 0.17 which is 2.94 to 1, or an intensity contrast ratio of 8.65 to 1. The range of operating conditions for two films or chips having equal rotations can be seen more graphically in FIG. 16 where three rectified cosine curves have been drawn for the transmission amplitudes of the background, single film images, and crossed-images as discussed above, as a function of analyzer rotation. Note that there are six curve intersections per 180° range of analyzer angles, representing six characteristic points where a brightness match can be obtained between some two of the three image conditions. The dashed vertical line at 80° shows the analyzer position at R80° just discussed above. In general, the analyzer positions in the neighborhood of 0° and 180° should not be used, due to low contrast, except where unavoidable in the application.

Figure 16:
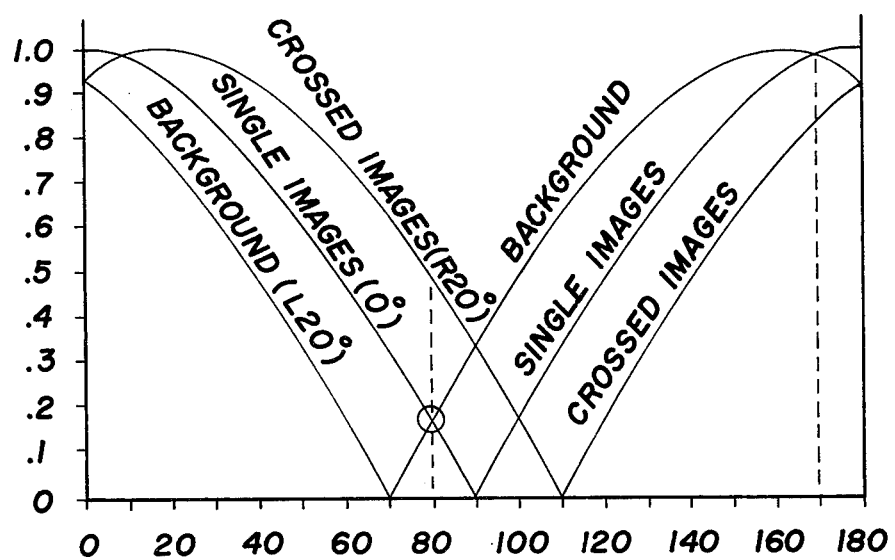
FIG. 16 is a graph in the manner of FIG. 15 for two chips.

The curves of FIG. 16 are symetrical. Thus, the brightness-matching intersection of any two curves represents a polarization analyzer angular position which is midway between the positions of the minimum brightness points as well as midway between the positions of the maximum brightness points for those curves. For example, the intersection, at 80°, of the single image curve with the background curve is halfway between the 90° and 70° minimum brightness points for the image areas, respectively, represented on those curves, and is also halfway between the 0° and 160° maximum brightness points for those curves. Accordingly, the method for determining where to set the analyzer to match the brightness of two adjacent areas having a common boundary, and also thereby supress the boundary between them, is to first turn the analyzer until one of the image areas is at minimum brightenss and note the analyzer position. The analyzer is then turned until the other image area is at minimum brightness and that position noted. Finally, the analyzer is set midway between the two positions thus noted. Alternatively, the two maximum brightness positions can be used using the same technique.

The curves of FIG. 16 indicate (and applicant's experiments have proven) that the analyzer set at any position other than a position corresponding to one of the six characteristic curve-intersection points, all three storage image conditions can be observed. For example, with the analyzer at 72.12°, the crossed images are bright, single images are darker, and the background is quite dark, and is near extinction. In fact, the crossed image amplitude is twice the single image amplitude at this angle, so the display can be used for quantitative image addition. This occurs because cosine 52.12°=2x cosine 72.12°=0.6140. Many other brightness ratios of possible interest for image processing can be found. For example, at 82.76°, the background amplitude is the geometric mean between the (dark) single image amplitude and the (bright) crossed image amplitude, while at 71.12°, the single trace amplitude is the arithmetic mean between the (bright) crossed image amplitude and (dark) background amplitude.

With further reference to the curves of FIG. 16, it should be noted that the polarization analyzer can be positioned so that the brightness of the three possible composite image states of those two referenced films can be put in any possible order of relative brightness. For example, with the analyzer between 10° and 80° relative to the polarizer, the crossed image condition (C) is the brightest, the single image condition (S) is next bright, and the background condition (B) is least bright, or darkest. That relationship may be stated in shorthand notation as C—S—B. The analyzer between 90° and 100° yields B—C—S; 100° to 170° yields B—S—C; 170° to 180° yields S—B—C; and 0° to 10° yields S—C—B.

It can also be seen in FIG. 16 that in order to obtain a selected brightness relationship, the analyzer can be set anywhere within an appropriate range which does not contain any of the previously discussed brightness matching curve intersection points since the brightness hierarchy is different on opposite sides of each intersection point. For the brightness order C—S—B, for example, the crossed images are brighter than the background all the way from 0° to 90° while the single image areas have an intermediate brightness level only from 10° to 80° since the single image curve is bounded by brightness-matching curve intersection points at 10° and 80°. Accordingly, to determine where to position the polarization analyzer in order to obtain a desired order of brightness of the different image areas, the brightness maximum, minimum, and matching points are first determined as previously described. The analyzer is then positioned corresponding to that curve segment which is most narrowly limited to the shortest range of analyzer positions between brightness matching curve crossing points and within the range having the desired order of image area brightness.

Figure 17:
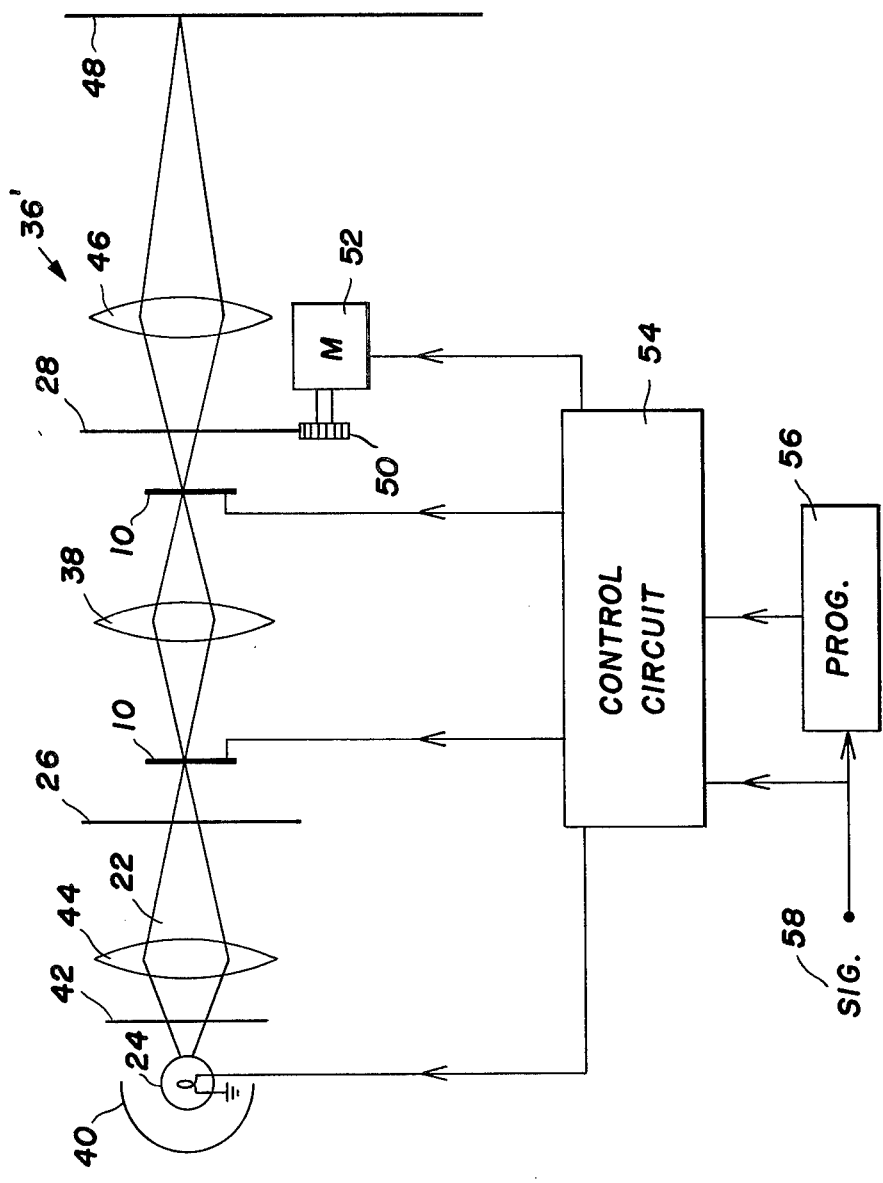
FIG. 17 is a simplified drawing of a system according to the present invention employing a relay lens and a motor drive to adjust the position of the polarization analyzer.

Specific display systems for implementing the present invention will now be discussed. Display system 36' of FIG. 17 corresponds substantially to the basic system 36 of FIG. 3. In the absence of two chips 10 comprising films 14 on opposite sides of the same substrate 12 or if simply desired, a relay lens 38 can be disposed between two separate chips 10 to image one upon the other. A reflector 40 is disposed behind the light source 24 to reflect the light beam 22 forward through a heat filter 42 and collimating lens 44. A focusing lens 46 is provided after the polarization analyzer 28 to focus the light beam 22 on the viewing plane 48. The polarization analyzer 28 is rotated through gear 50 by a stepping motor 52. The light source 24, chips 10, and stepping motor 52 are controlled by control circuit 54 which receives input from a program source 56 and a signal source 58 to obtain the display effects described.

Figure 18:
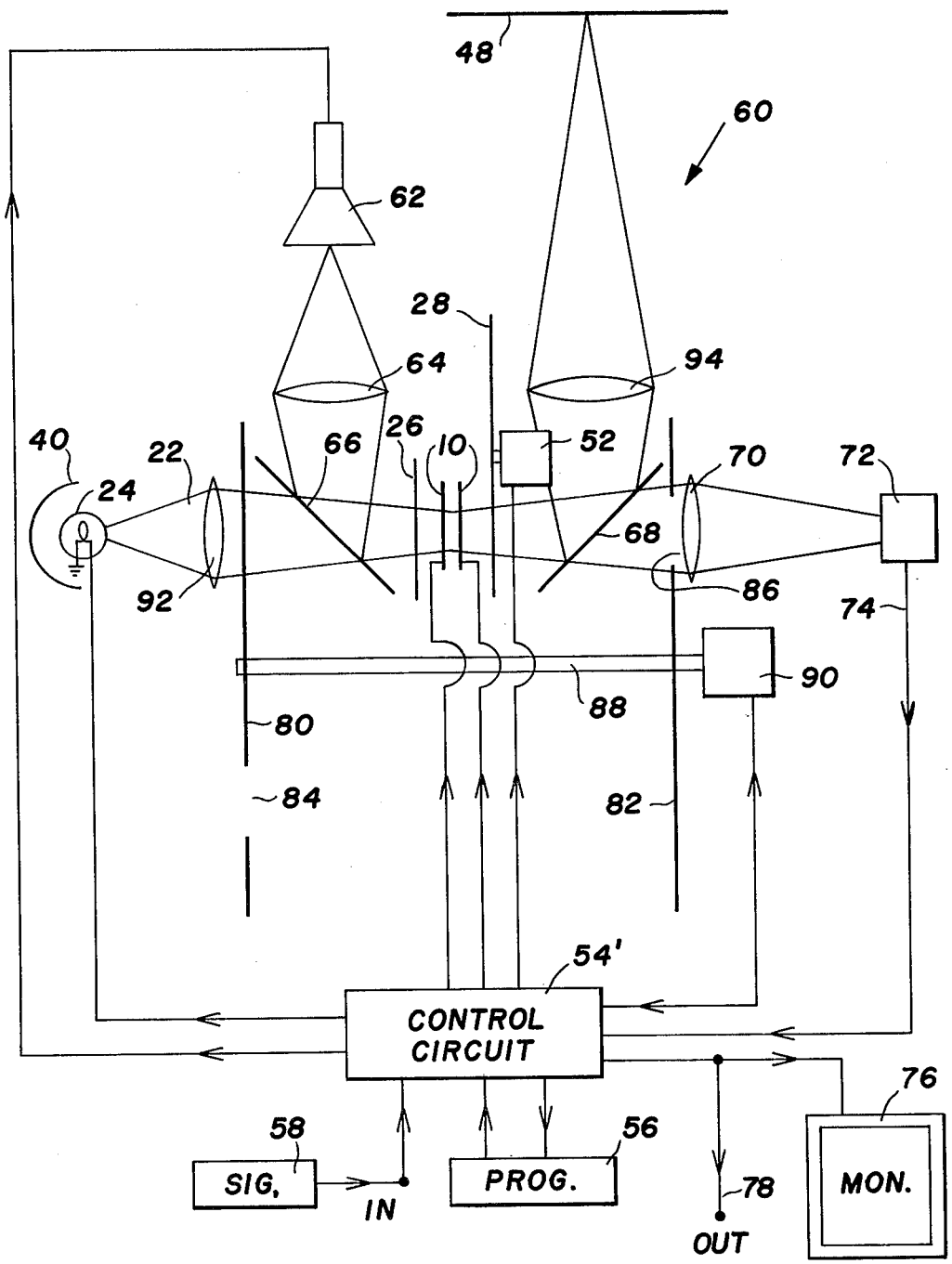
FIG. 18 is a simplified drawing of a more complex system according to the present invention.

Rather than producing a visual display image for projection or direct viewing, as previously mentioned, the system of the present invention can be used to generate an electrical signal which represents the image processing which has been described hereinbefore. Such a system is shown, generally indicated as 60, in FIG. 18. In the system 60 of FIG. 18, a signal source 58 such as a computer, flying spot scanner, radar system, or other source, drives a control circuit 54' which writes a magnetic image on the two chips 10 while a program source 56 provides predetermined information as to whether a coincidence, anti-coincidence, or other output is desired. The control circuit 54' drives a polarization analyzer disc 28 to the appropriate angular position for the selected type of output by means of a stepping motor 52 connected directly thereto. The control circuit 54' provides a blank raster on the cathode ray tube 62 for use as a flying spot scanner. The raster is then imaged through lens 64, half-silvered mirror 66, polarizer 26, the chips 10, polarization analyzer 28, a second half-silvered mirror 68, and lens 70 onto the photo-multiplier 72. The output 74 of photo-multiplier 72 is connected back to the control circuit 54' wherein it may be clipped, coded, digitized, or otherwise processed and be displayed on the monitor 76 as well as transmitted out of the system at output terminal 78 for remote use. A pair of chopper wheels 80, 82 having apertures 84, 86, respectively therein, are mounted on a common shaft 88 for turning by motor 90 which is also controlled by control circuit 54'. With the apertures 84, 86 positioned as shown in FIG. 18, the above-described optical sequence takes place. If the shaft 88 is turned by motor 90 such that the apertures 84, 86 are positioned 180° from the their position of FIG. 18, a second optical sequence takes places. In that position, the aperture 84 in chopper wheel 80 passes the light 22 from source 24 through lens 92, mirror 66, the polarizer 26, the two chips 10, the polarization analyzer 28, mirror 68, and lens 94 to be focused at the viewing plane 48. In that position, additionally, the photo-multiplier 72 is protected from saturation by being blocked off by the chopper wheel 82. As thus configured, the control circuit 54' may drive the motor 90 in a stepwise fashion to give a choice of direct viewing or electrical readout. In the alternative, the motor 90 may be driven as a continuously turning motor to provide simultaneous time-shared direct viewing and electrical read-out, with monitor viewing. Direct viewing at reduced brightness is also presented on the viewing screen by the CRT 62 illumination, in the electrical read-out mode.

The image processing capability of two chips may also be combined with the switchable tandem chip configuration of my above-described co-pending application titled SWITCHABLE TANDEM MEMORY MAGNETO-OPTIC DISPLAY, in which an intermediate polarizer is positioned to delete the image on either of two tandem chips, or to combine the two images. This is shown in FIG. 19. Light passes through three polarizers and three chips in the sequence shown in the figure, from the lamp to the observer. When the three polarizer axes (P1, P2, P3) are positioned, respectively, at 0°, 80°, and 80° (for right-handed writing and 10° chips) chips C1 and C2 form a coincidence image and any image on C3 is not visible since it is between parallel polarizers. On changing the polarizers to a configuration of 0°, 80°, and 155°, the image on C3 is superimposed on the coincidence image from C1 and C2. However, there is no combination of polarizer positions which completely "washes out" all possible images from C1 and C2. This can be accomplished by erasing at least one of those chips, or by writing them with identical images of opposite polarity.

The configuration of FIG. 20 offers the possibility of superimposing any two of the previously discussed two-chip images by independently setting the differential angles formed between P1 and P2, and between P2 and P3. In another mode of operation, rotating only P2 can act either to increase angle P1-P2 and decrease P2-P3, or to increase or decrease both angles together, depending on the starting conditions. Many combinations of image effects can be obtained.

In some embodiments and/or applications it may be desirable or necessary to change the orientation of any or all of the required polarizers more rapidly or more quietly than is possible using motor driven relation. In those instances, Kerr cells, Pockels cells, Faraday cells, or like means all well known in the art, may be used for that purpose within the scope of the present invention. Similarly, the orientation of the required polarizers may need to be changed only slowly or infrequently. In those cases, the polarizers can be moved manually or by simple manually controlled mechanical rotational positioning apparatus. That is, the basic novelty of the present invention is not dependent on any one particular method of positioning the polarizers.

The basic teachings and benefits of the present invention may also be employed to advantage in embodiments and systems in which no human observation takes place and the transmitted light is directed to light sensitive detectors or other light responsive surfaces for processing or recording optical image data. One such application is to use the specialized light modulating chip assembly of the present invention as the input spatial light modulator and/or the spatial filter in a three plane optical image correlator, or a similar correlator.

Those skilled in the art should recognize that while adjustment of the polarization analyzer has been described herein as the means of adjusting the relative angle between the polarizer and analyzer axes, the same effect can be realized by adjusting the polarizer, or both in combination. Thus, when such adjustment of the analyzer is referred to herein or in the claims which follow, the alternate methods are included therein.

It should be further noted and understood that while some of the descriptions herein are with reference to a continuous, coherent beam of visible light, the apparatus and teachings of the present invention are applicable to the modulation of light or electromagnetic radiation outside of the visible spectrum (such as infra-red light) and to coherent or incoherent light which may be continuous, pulsed or temporally or spatially modulated before or after traversing the apparatus of the present invention.

Another future possibility lies in the remarkable fact that two chips in a polariscope sandwich can display completely different images when viewed from opposite sides. In a simple display transparency built and demonstrated by the applicant, an image of the character "7" is seen from one side while "14" is seen from the other side. Both characters are light images on a dark background. The existence of a transparancy having different images when viewed from opposite sides is not only novel and completely unexpected, but also serves to illustrate the unexpected results obtained by matching the brightness of undesired image elements to adjacent elements so they cannot be seen. The effect may be roughly likened to a camouflage pattern which when applied to a vehicle, building, or the like causes it to visually merge into its background.

The "7"/"14" phenomenon described above was achieved according to the techniques of the present invention by writing the character "7" with $+10°$ of rotation on a $-10°$ background on one chip. The character "14" (written backwards) was written with $-10°$ of rotation on a $+10°$ rotation background on the second, overlying, chip. As thus constructed, the combined rotations of both chips are, initially, 20° for the character "7" image areas, 0° for the common background, and $-20°$ for the character "14" image areas. With the polarization analyzer at $+80°$ relative to the input polarizer (viewed looking towards the light source), the background and character "14" areas polarization axes are each 10° away from the crossed-polarization condition of $-10°$ relative to the analyzer and are, therefore, equally dark such that the character "14" cannot be seen. The character "7" areas, however, have a polarization axis 30° away from the crossed position of $-10°$ and are bright and visible against the background.

If the assembly is then viewed from the other side with the light passing through it in the opposite direction without moving the polarizers, the relative position of the polarizer which now functions as the polarization analyzer is still 80° relative to the input polarizer. Because of the constant rotational direction of the Faraday rotation regardless of light direction, however, the character "7" and background polarization axes are now at $-20°$ and $0°$, respectively, placing them each equally 10° away from the crossed-polarization condition of $-10°$ which makes them equally dark so that the character "7" cannot be seen. The character "14" polarization axis, on the other hand, is now 30° away from the crossed-polarization condition of $-10°$ and is, therefore, bright and visible.

As will be understood, three, or more, chips 10 can be placed between the polarizer 26 and polarization analyzer 28 to create additional effects. With present materials, the limiting number appears to be four chips because of the light impeding effect of the film 14 even in its "transparent" state. These can be designed by constructing a graph in the manner of FIG. 16. More curves will be involved and more points of coincidence. The analysis, however, is the same. Reference to Table I which follows will give an idea of the possible combination of effects which can be realized:

TABLE I

| Number of chips | 0 | 1 | 2 | 3 | 4 | 5 | 6 | 7 | 8 | 9 |
|---|---|---|---|---|---|---|---|---|---|---|
| Brightness levels (Cos curves) | 1 | 2 | 3 | 4 | 5 | 6 | 7 | 8 | 9 | 10 |
| Curve intersections per 180° | 0 | 2 | 6 | 12 | 20 | 30 | 42 | 56 | 72 | 90 |
| High contrast intersections | 0 | 1 | 3 | 6 | 10 | 15 | 21 | 28 | 36 | 45 |
| Single intersections | 0 | 1 | 3 | 4 | 4 | 4 | 4 | 4 | 4 | 4 |
| Double intersections | 0 | 0 | 0 | 1 | 3 | 4 | 4 | 4 | 4 | 4 |
| Triple intersections | 0 | 0 | 0 | 0 | 0 | 1 | 3 | 4 | 4 | 4 |
| Quadruple intersections | 0 | 0 | 0 | 0 | 0 | 0 | 0 | 1 | 3 | 4 |

Wherefore, having thus described my invention, I claim:

1. A magneto-optic display generator for disposition in a beam of electromagnetic radiation comprising, in sequence:
   (a) a stationary polarizer;
   (b) a first and a second magneto-optic display chip to process information provided from a first and second source respectively;
   (c) a rotatable polarization analyzer;
   (d) means to rotate said polarization analyzer relative to said polarizer; and
   (e) control means operably connected to said first chip, second chip, and rotating means both to drive and rotate said chips and rotating means, respectively; said control means including:
      (1) means to align the polarization axis orientation of said polarization analyzer relative to the polarization axis of said polarizer to result in selected classes of image area portions relative to said polarization analyzer axis being within a range of relative orientations bounded at each end by the occurrence of substantially equal brightness of at least any two selected classes of said image area portions, so that a predetermined hierarchal order of brightness of said image portions is obtained throughout said range of relative axis orientations whereby any common boundary and any brightness difference between said image area portions is substantially eliminated, and information not explicity present in said first and second display chip thereby extracted.

2. the magneto-optic display of claim 1 in which the angles developed by the respective light polarization axes of said two selected classes of said image area portions relative to said polarization analyzer axis have equal cosines.

3. An image processing system comprising in sequence:
   (a) means for generating a beam of electromagnetic radiation;
   (b) a polarizer;
   (c) a first magneto-optic display chip adapted to be connected to a driver providing first display information;
   (d) a second magneto-optic display chip adapted to be connected to a driver providing second display information;
   (e) a polarization analyzer mounted for adjusting the polarization axis orientation thereof with respect to the polarization axis of said polarizer;
   (f) control means operably connected for driving said first chip, said second chip, and said polarization analyzer in combination to align said polarization axis orientation to result in the relative polarization axis orientation of said polarizer and said polarization analyzer being within a range of relative orientations so that a predetermined hierarchal order of said image portions is obtained throughout said range of relative axis orientations whereby any common boundary and any difference between said image area portions is substantially eliminated; and,
   (g) means for detecting said beam and for generating an electrical output signal reflecting a resulting display image impressed on said beam.

4. The system of claim 3 additionally comprising:

means operably connected to said control means for selecting the display image format.

5. The magneto-optic display of claim 6 in which the angles developed by the respective light polarization axes of said two selected classes of said image area portions relative to said polarization analyzer axis have equal cosines.

6. The system of claim 3 and additionally comprising:
monitor means connected to received said electrical output signal for displaying the contents of said signal.

7. The system of claim 3 and additionally comprising:
(a) beam splitter means disposed in said light beam between said polarization analyzer and said detection and signal generating means for splitting off a portion of said light beam; and
(b) means disposed to focus said portion of said light beam at a viewing plane.

8. The system of claim 7 and additionally comprising:
first means disposed in said light beam after said splitter means for selectively blocking said light beam from impinging on said detection and signal generating means.

9. The system of claim 8 wherein:
said first blocking means is a chopper whereby said detection and signal generating means is prevented from saturating when said portion is being maintained continuously at said viewing plane.

10. The system of claim 9 and additionally comprising:
(a) means operably connected to said control circuit means for selectively creating a raster scan light beam;
(b) beam combining means disposed in said light beam and said raster scan light beam for combining both light beams along the path of said light beam; and,
(c) second means disposed in said light beam before said beam combining means for selectively blocking said light beam.

11. The system of claim 10 wherein:
said first and second light beam blocking means are operably connected to said controls circuit means for operation in combination such that said portion at said viewing plane is from said light beam along and the light impinging on said detection and signal generating means is from said raster scan light beam alone whereby the entire display from said chips can be viewed simultaneously with its being raster scanned and detected.

12. A magneto-optic light modulator for positioning in a light beam and adapted to receive and impart modulation information to the light beam, comprising, in sequence:
(a) a light polarizer;
(b) at least first and second magneto-optic modulator means for imparting respective first and second angular light modulation information to the light beam;
(c) a polarization analyzer whereby selected angular combinations of said first and second angular light modulation information imparted to the light beam are transmitted, and
(d) at least one of said polarizer and said polarization analyzer is mounted to allow the polarization axis orientation thereof with respect to the polarization axis of the other to be adjusted within a range of relative orientations which is bounded at each end by the occurrence of equal brightness of any two portions of said modulation information whereby a pre-determined hierarchal order of brightness of said portions is obtained throughout said range of relative axis orientations.

13. The light modulator of claim 12 wherein:
the relative polarization axis orientation of said polarizer and said polarization analyzer is substantially midway between the two relative orientations corresponding to the two brightness extremes of two portions of said modulation information whereby the two brightnesses of said portions are rendered substantially equal.

* * * * *